(12) United States Patent
Lo et al.

(10) Patent No.: US 7,076,676 B2
(45) Date of Patent: Jul. 11, 2006

(54) SEQUENCE ALIGNMENT LOGIC FOR GENERATING OUTPUT REPRESENTING THE SLOWEST FROM GROUP WRITE SLAVES RESPONSE INPUTS

(75) Inventors: Tin-chee Lo, Fishkill, NY (US); Yuk-Ming Ng, Poughkeepsie, NY (US); Anil S. Keste, Bagalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/949,629

(22) Filed: Sep. 24, 2004

(65) Prior Publication Data

US 2005/0038974 A1    Feb. 17, 2005

Related U.S. Application Data

(62) Division of application No. 09/918,189, filed on Jul. 30, 2001, now Pat. No. 6,836,840.

(51) Int. Cl.
     *G06F 1/04*      (2006.01)
     *G06F 15/16*      (2006.01)

(52) U.S. Cl. ........................................ 713/375; 712/31

(58) Field of Classification Search ................. 712/31; 713/400

See application file for complete search history.

(56) References Cited

U.S. PATENT DOCUMENTS

| | | | |
|---|---|---|---|
| 4,493,053 A * | 1/1985 | Thompson | 710/61 |
| 4,727,509 A | 2/1988 | Johnson et al. | 360/15 |
| 5,579,505 A | 11/1996 | Ohkami | 711/155 |
| 5,590,372 A | 12/1996 | Dieffenderfer et al. | 710/3 |
| 5,835,697 A | 11/1998 | Watabe et al. | 714/11 |
| 5,978,927 A * | 11/1999 | Curry et al. | 713/502 |
| 6,005,869 A | 12/1999 | Sakai et al. | 370/452 |
| 6,032,238 A | 2/2000 | Green, III et al. | 711/170 |
| 6,047,336 A | 4/2000 | Green, III et al. | 710/22 |
| 6,081,860 A | 6/2000 | Bridges et al. | 710/110 |
| 6,671,761 B1 | 12/2003 | Kim | 710/244 |
| 6,812,852 B1 * | 11/2004 | Cesar | 340/825.69 |

* cited by examiner

*Primary Examiner*—Kenneth S. Kim
(74) *Attorney, Agent, or Firm*—Eugene I. Shkurko; Cantor Colburn LLP (57) ABSTRACT

A design and method of using a group write slave and a sequence alignment logic module including an identification stage, the identification stage having a first ID input, a second ID input, an ID AND gate, and an ID comparator, a select stage, the select stage having a first select input port, a group write comparator, an individual select comparator, an OR gate and a select AND gate, a Slave Module, wherein the Slave Module includes a group wait signal and a group rearbitrate signal and a sequence alignment logic module which includes a gated logic portion having logic circuitry constructed so as to create a sequence alignment logic module output signal by sequencing and combining the plurality of sequence alignment logic module input signals so as to represent the slowest of the sequence alignment logic module input signals.

14 Claims, 5 Drawing Sheets

SEQUENCE ALIGNMENT LOGIC FOR GENERATING OUTPUT REPRESENTING THE SLOWEST FROM GROUP WRITE SLAVES RESPONSE INPUTS

CROSS-REFERENCE TO RELATED APPLICATIONS

This application is a divisional of U.S. patent application Ser. No. 09/918,189 filed Jul. 30, 2001, now U.S. Pat. No. 6,836,840, the contents of which are incorporated by reference herein in their entirety.

FIELD OF THE INVENTION

The present invention relates to a group write slave which allows multiple slaves to be written to simultaneously by one master. The present invention further relates to a method for writing to multiple slaves using group write slaves.

BACKGROUND OF THE INVENTION

Figure 1:
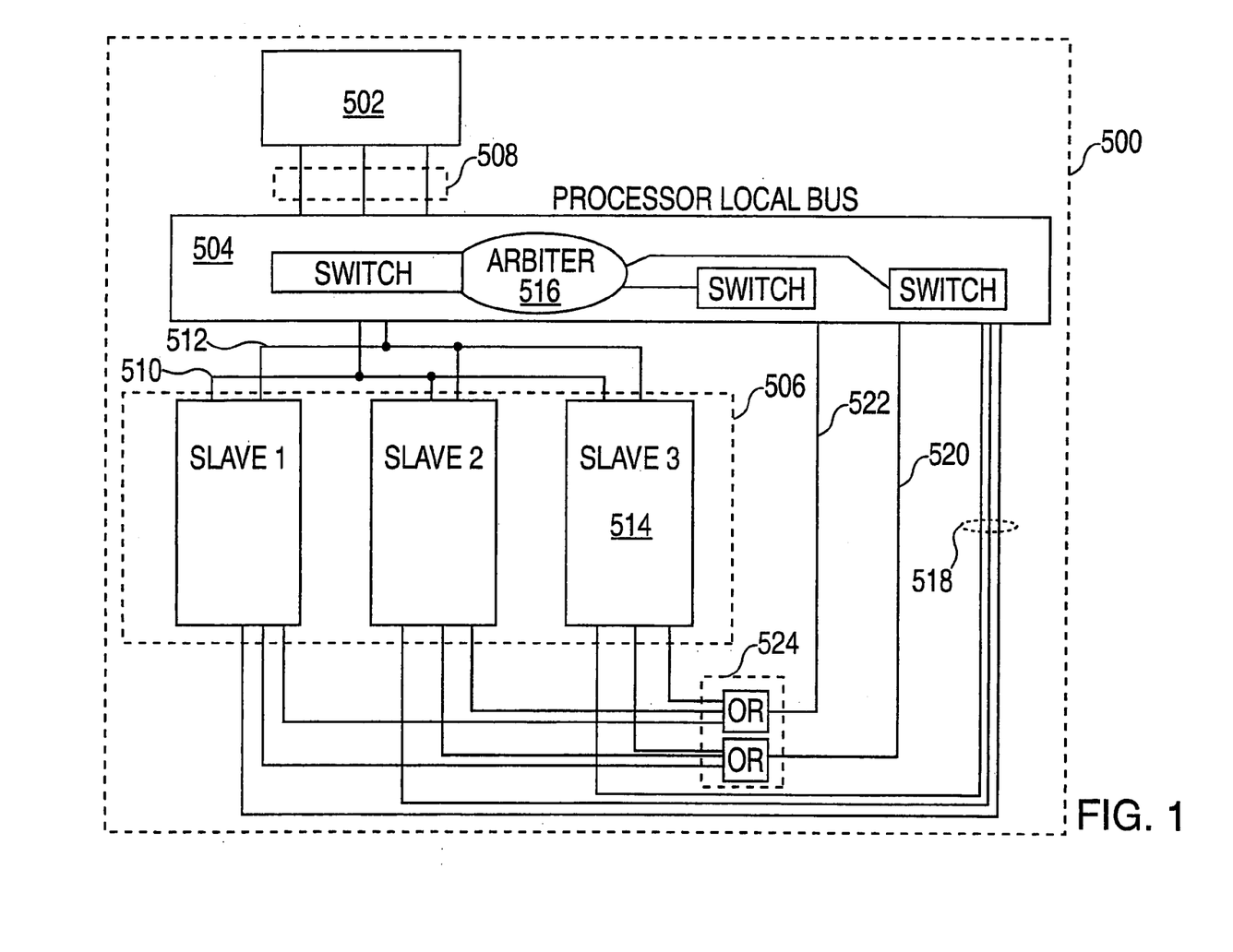
FIG. 1 is a block diagram of an existing design which employs a traditional processor local bus interconnect architecture.

Typically, system-on-chip, or Ultra Large Scale Integration (ULSI), designs which employ multiple masters and slaves and which employs a traditional processor local bus (PLB) interconnect architecture operate in the following manner. Referring to FIG. 1, a typical ULSI design 500 is provided which includes at least one master 502, a PLB core 504 and a plurality of slaves 506. Each master 502 is communicated to the PLB core 504 via at least one dedicated port or line 508. The multiple slaves in turn, are connected to the PLB core 504 via a PLB shared data bus 510 and a command bus 512 allowing each master to communicate with each slave connected to the PLB shared data bus 510 and the command bus 512. Each slave has a unique slave ID, or identifier code, which allows a master 502 to select and communicate with a particular slave 514 within the plurality of slaves 506. When a master 502 wants to communicate with the particular slave 514, the master 502 is required to send certain information to the PLB core 504 for distribution to the slaves 506. The slaves 506 then take this information and examine it for the slave ID. An example of this information is the selected bus command (CMD), the write_data command and the address (Addr) which contains the desired slave ID. If the slave ID sent by the master 502 matches the predetermined slave ID of a slave 514, then that slave 514 has been selected and the action requested by the master 502 is performed. Because each slave 514 has a unique slave ID, multiple slave selections by one master 502 are prevented and each slave 506 can only be accessed by one master 502 at one time. In the case where multiple masters 502 are making requests to a targeted slave 514, the PLB core 504 typically includes an arbiter circuit 516 which determines request priority based on a predetermined priority level or priority scheme.

The selected slave 514 will then gate in the information sent by the master 502. If the slave 514 is ready to process this request, the Addr information will be latched and the slave 514 will send a status signal back to the PLB core 504, and hence to the requesting master 502, via a type one dedicated line 518. In addition, the selected slave 514 will also communicate slave results and other information to the PLB core 504 via a gated OR circuit 524, and hence the master 502, via a type two shared status bus 520. Lastly, a status signal from all of the slaves 506 will be OR'ed together using a gated OR circuit 524 and this information will be communicated to the arbiter 516 via a type three shared status bus 522. These status signals typically include a re-arbitrate request signal which is the slave 514 requesting the arbiter 516 to re-arbitrate the bus because the slave 514 was unable to perform the requested function, a wait signal which informs the arbiter 516 to wait for the latching of the incoming address needed for the current command execution before continuing and a write complete signal, which informs the arbiter 516 that the write operation has been completed.

As indicated by the above discussion, traditional PLB interconnect architecture allows a master 502, such as a microprocessor or a system code server, to write code to only one of many slaves 506, such as main memory, at any one time. In the case where the same data has to be written in multiple places, this sequential write scheme increases processing time and impedes system efficiency. This is because typically data is written to the Level-3 (L3) cache in order to condition the system and not to the Level-2 (L2) cache. However, if the processor examines the L2 cache and the desired data is not within the L2 cache, the processor then obtains the data from the L3 cache and updates the L2 cache. This process takes time and impedes system efficiency. Although this is sufficient for most systems that can tolerate sequential write operations, this is not desirable for system-on-chip systems having an embedded processor core with an L2 and L3 cache as one of the PLB masters.

In system-on-chip, or ULSI, designs that employ an embedded processor core as one of its PLB masters, wherein the processor has an L2 cache, it is desirable for the system code server to be able to write to multiple slaves, such as L2 and L3 cache, at the same time. One advantage which a multiple slave write capability provides would be to allow the processor to obtain the desired data faster than a traditional design having a single write capability, thus allowing the processor to expedite its processing time and to use its L2 cache more effectively.

The need remains for a slave design, and a method for using the slave design, which incorporates all of the performance characteristics of current slave designs, yet provides for the capability to select and communicate with multiple slaves, as a group or as individuals, simultaneously.

SUMMARY OF THE INVENTION

An embodiment of the invention is a group write slave which comprises: an identification stage having a first ID input, a second ID input and an ID output, wherein the identification stage includes ID logic circuitry for processing the first ID input and the second ID input; a select stage having a select input and a select output, wherein the select stage includes select logic circuitry for processing the select input; and a slave module, wherein the slave module includes a plurality of slave inputs communicated with the select output and the ID output, a plurality of slave outputs and slave logic circuitry for processing the plurality of slave inputs so as to create the plurality of slave outputs.

An additional embodiment of the invention is a sequence alignment logic module which comprises: a plurality of SAL inputs for receiving a plurality of SAL input signals from a plurality of group write slaves; at least one SAL output for communicating at least one SAL output signal; and a gated logic portion, the gated logic portion having logic circuitry communicated with the plurality of SAL inputs and the SAL output, wherein the logic circuitry is constructed so as to create the SAL output signal by sequencing and combining the plurality of SAL input signals so as to represent the slowest of the plurality of SAL input signals.

Another embodiment of the invention is a method for using a group write slave and a sequence alignment logic module which comprises: obtaining a computing system that employs a master, at least one conventional slave, at least one group write slave, three sequence alignment logic modules, multiplexor logic circuitry and a processor local bus; selecting the group write slaves so as to cause the group write slave to create a slave response; applying the slave response to the sequence alignment logic module so as to create a mixed response; applying the slave response and the mixed response to the multiplexor logic circuitry so as to create a multiplexor response; performing logical operations on the multiplexor response so as to create a gated OR response having a wait signal and a rearbitrate signal; and communicating the gated OR response to the master and to the group write slaves.

DETAILED DESCRIPTION OF THE INVENTION

Figure 2:
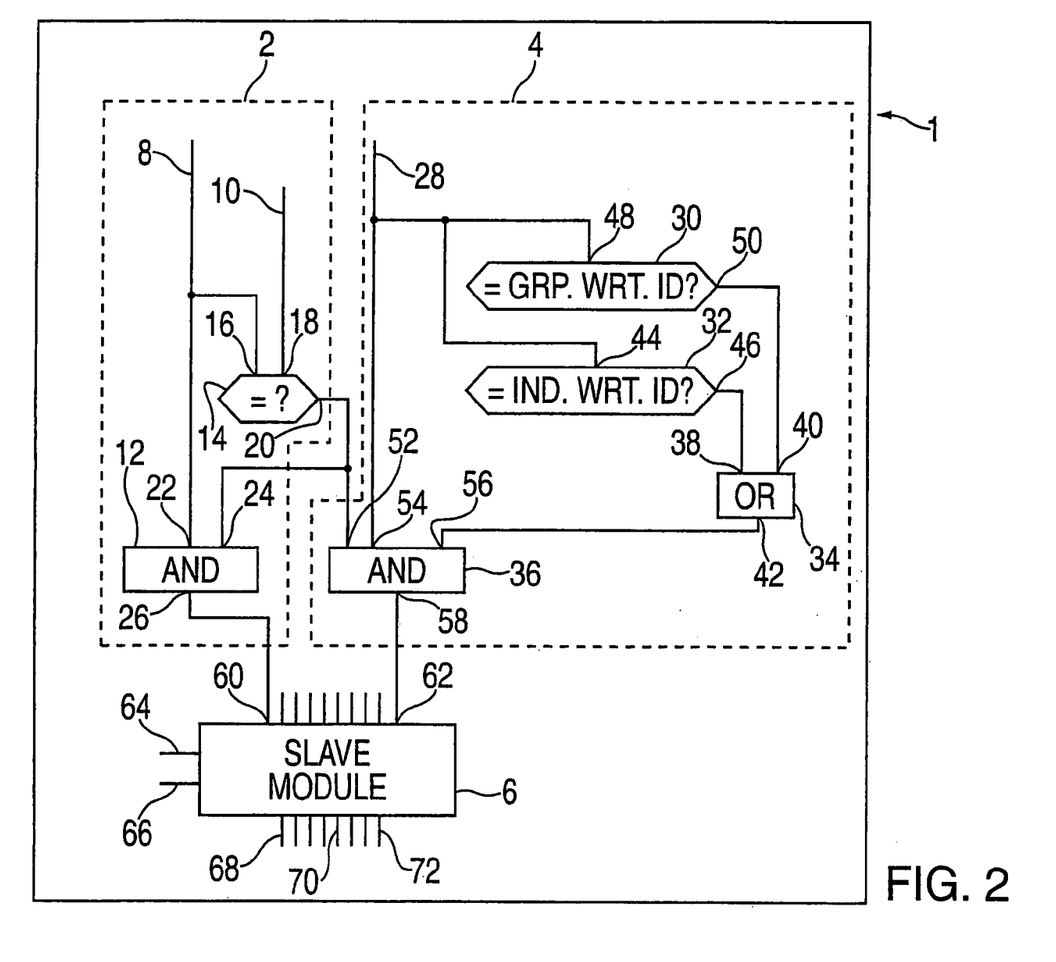
FIG. 2 is a block diagram of a group write slave in accordance with an embodiment of the present invention.

Referring to the drawings, FIG. 2 illustrates a group write slave 1, in accordance with an embodiment of the invention, having an identification stage 2, a select stage 4 and a slave module 6. Identification stage 2 preferably includes a first ID input 8, a second ID input 10 and ID logic circuitry having an ID AND gate 12 and an ID comparator 14. The ID comparator 14 includes a first comparator input 16 communicated with first ID input port 8, a second comparator input 18 communicated with second ID input port 10 and an ID comparator output 20. ID comparator 14 also includes ID comparator logic circuitry which compares the first comparator input 16 with the second comparator input 18. ID AND gate 12 includes a first AND input 22 communicated with first ID input port 8, a second AND input 24 communicated with ID comparator output 20 and an ID output 26.

In addition, select stage 4 preferably includes a select input 28 and select logic circuitry having a group write comparator 30, an individual select comparator 32, an OR gate 34 and a select AND gate 36. OR gate 34 includes a first OR input 38, a second OR input 40 and an OR output 42. Individual select comparator 32 includes an individual write input 44 communicated with select input 28 and an individual select output 46 communicated with first OR input 38. Group write comparator 30 includes a group write input 48 communicated with first select input 28 and a group write output 50 communicated with second OR input 40. In addition, group write comparator 30 includes group write logic circuitry for processing select input 28 and which compares the group write input 48 with a stored group write identifier. Individual select comparator 32 includes individual select logic circuitry for processing select input 28 and which compares the individual select input 44 with a stored individual select identifier. Select AND gate 36 includes a first select AND input 52 communicated with the ID comparator output 20, a second select AND input 54 communicated with select input 28, a third select AND input 56 communicated with OR output 42 and a select output 58.

Slave module 6 preferably includes a plurality of slave inputs having a first slave input 60, a second slave input 62, a group wait signal input 64 and a group rearbitrate signal input 66. In addition, slave module 6 includes a plurality of slave outputs having a first slave output 68, a second slave output 70 and a third slave output 72. First slave output 68, second slave output 70 and third slave output 72 are preferably communicated with a type one status bus 316, a type two status bus 318 and a type three status bus 320, respectively as described with reference to FIG. 5. First slave input 60 is communicated with ID AND output 26 and second slave input 62 is communicated with the select AND output 58. Slave module 6 preferably include slave logic circuitry for processing the plurality of slave inputs so as to create the plurality of slave outputs. In addition, slave module 6 is responsive to a group wait signal 64 and a group rearbitrate signal 66, which are generated through a logical operation conducted external to the group write slave 1.

Figure 3:
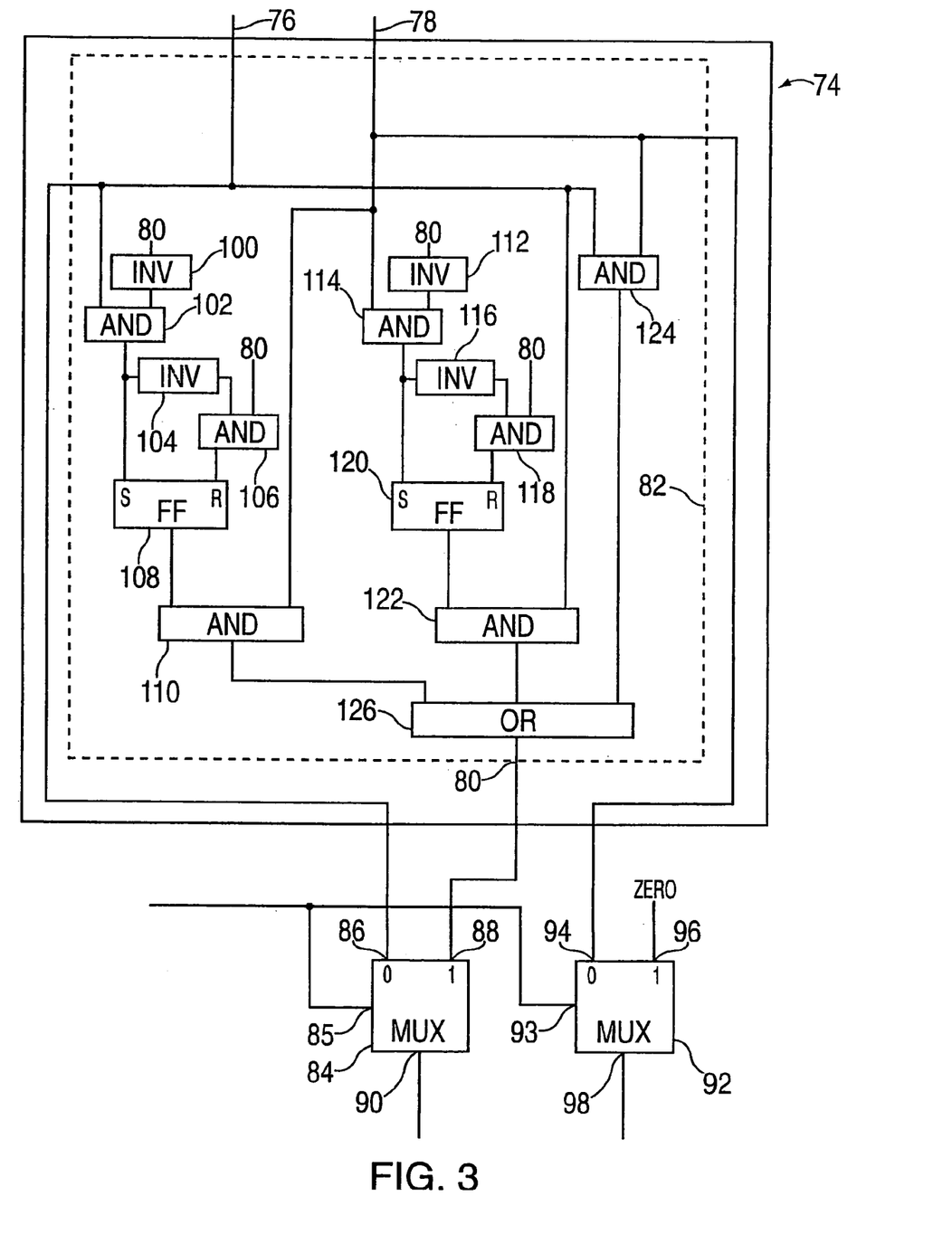
FIG. 3 is a block diagram of a Sequence Alignment Logic Module with multiplexor circuitry in accordance with an embodiment of the present invention.

Referring to FIG. 3, a sequence alignment logic module 74, in accordance with an embodiment of the invention, is illustrated having a plurality of SAL inputs which include a first SAL input 76 and a second SAL input 78 for receiving a plurality of SAL input signals from a plurality of group write slaves. Also included is a SAL output 80 for communicating at least one SAL output signal and a gated logic portion 82 which includes logic circuitry constructed so as to create a SAL output signal representing the slowest of the plurality of SAL input signals by sequencing and combining the first SAL input 76 and the second SAL input 78. A first multiplexor 84 is provided having a first data input 86, a first GRL data input 88 and a first multiplexor output 90. Preferably, first data input 86 is communicated with the first SAL input 76 and first GRL data input 88 is communicated with SAL output 80. A second multiplexor 92 is also provided and includes a second data input 94, a second GRL data input 96 and a second multiplexor output 98. Preferably, second data input 94 is communicated with second SAL input 78 and second GRL data input 96 is held to a logic zero. In addition, first multiplexor 84 includes a first multiplexor select input 85 and second multiplexor 92 includes a second multiplexor select input 93.

In accordance with an embodiment of the invention, when said first multiplexor select input 85 is held to one of either a logic high or a logic low state, the first multiplexor output 90 is equal to the first SAL input 76 and when the first multiplexor select input 85 is held to the other of the logic high or the logic low state, the first multiplexor output 90 is equal to the SAL output 80. Similarly, when the second multiplexor select input 93 is held to one of either a logic high or a logic low state, the second multiplexor output 98 is equal to the second SAL input 78 and when the second multiplexor select input 93 is held to the other of the logic high or the logic low state, the second multiplexor output 98 is equal to the second GRL data input 96.

Again, referring to FIG. 3, the functional flow of a sequence logic module 74, in accordance with one embodiment of the invention is described. The SAL output 80 is inverted using an inverter 100. The output of inverter 100 and first SAL input 76 is then applied to a gated AND circuit 102. The output of gated AND circuit 102 is then inverted 104 and applied to a gated AND circuit 106 along with SAL output 80. The output of gated AND circuit 106 is then applied to the Reset (R) input of RS flip-flop 108 and the output of gated AND circuit 102 is applied to the Set (S) input of RS flip-flop 108. The output of RS flip-flop 108 and second SAL input 78 is then applied to a gated AND circuit 110. Similarly, the SAL output 80 is inverted using an inverter 112. The output of inverter 112 and the second SAL input 78 is then applied to a gated AND circuit 114. The output of gated AND circuit 114 is then inverted 116 and applied to a gated AND circuit 118 along with SAL output 80. The output of gated AND circuit 118 is then applied to the Reset (R) input of RS flip-flop 120 and the output of gated AND circuit 114 is applied to the Set (S) input of RS flip-flop 120. The output of RS flip-flop 120 and first SAL input 76 is then applied to gated AND circuit 122. The first SAL input 76 and the second SAL input 78 are then applied to gated AND circuit 124 and the output of gated AND circuit 110, gated AND circuit 122 and gated AND circuit 124 are then applied to a gated OR circuit 126. The output of gated OR circuit 126 is SAL output 80.

In accordance with an embodiment of the invention flip-flop 108 and flip-flop 120 are preferably RS flip-flops. However, any flip-flop known in the art suitable to the desired end purpose may be used.

Referring to FIG. 2, FIG. 3, FIG. 4 and FIG. 5, a method of using a group write slave 1 and a sequence alignment logic module 74, in accordance with an embodiment of the invention, is illustrated. As shown in step 200, a computing system 300 is obtained which employs a master 302, a conventional slave 304, a plurality of group write slaves 306 which include a first group write slave 326 and a second group write slave 328, a processor local bus 310 having arbiter circuitry 311 and three sequence alignment logic modules, each having multiplexor logic circuitry 308. One of the three sequence alignment logic modules 308 is preferably communicated with the first group write slave 326 and the second group write slave 328 via the type one status bus 316. Another of the three sequence alignment logic modules 308 is preferably communicated with the first group write slave 326 and the second group write slave 328 via the type two status bus 318. The last of the three sequence alignment logic modules 308 is preferably communicated with the first group write slave 326 and the second group write slave 328 via the type three status bus 320.

Figure 5:
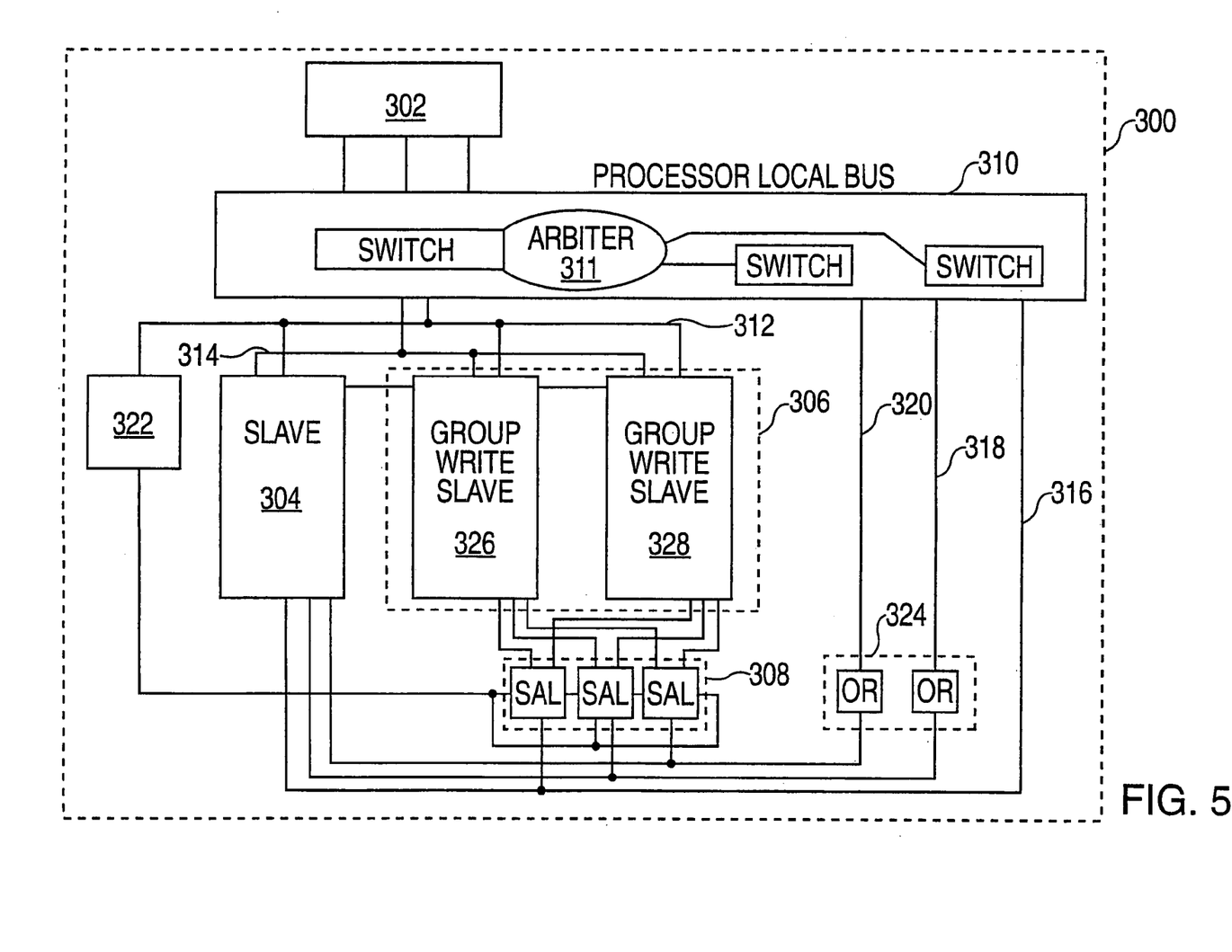
FIG. 5 is a block diagram of an overall system view which incorporates a conventional slave, two group write slaves and three sequence alignment logic modules in accordance with an embodiment of the present invention.

The master 302 is preferably communicated with the processor local bus 310 which is communicated with the conventional slave 304 and the group write slaves 306 via a command bus 312 and a shared bus 314. In addition, group-write slaves 306 are communicated with sequence alignment logic modules 308 which are, in turn, communicated with processor local bus 310 via a type one status bus 316, a type two status bus 318 and a type three status bus 320. Type two status bus 318 and type three status bus 320 are preferably communicated with PLB 310 via gated OR circuitry 324. Computing system 300 preferably includes separate decoder circuitry 322 which reads the command attribute, determines whether the slaves 306 have been selected for a group write operation or an individual write operation and communicates a multiplexor select signal to the sequence alignment logic modules 308.

In accordance with an embodiment of the invention, first ID input 8 of each group write slave 306 is communicated with master 302 so as to allow communication of a first master signal which includes slave address information and slave ID information, second ID input 10 of each group write slave 306 is communicated with master 302 so as to allow communication of a second master signal which includes predefined group write identification information and select input 28 of each group write slave 306 is communicated with master 302 so as to allow communication of a third master signal which includes group write command information. In accordance with the present invention, second ID input 10 may be hardwired within group write slave 1 so as to contain predefined group identification information.

Figure 4:
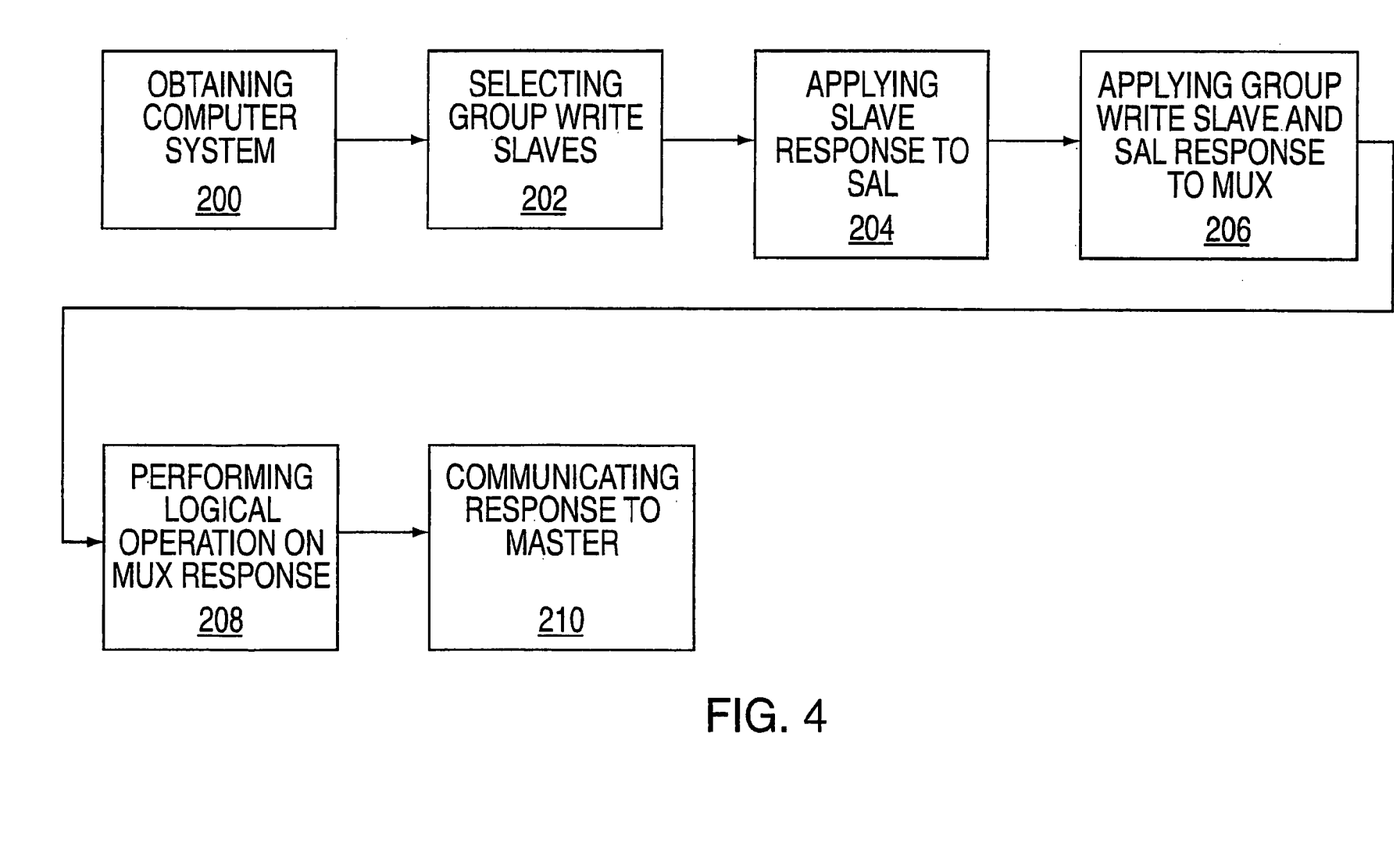
FIG. 4 is a flow diagram of a method of using a group write slave and a sequence alignment logic module in accordance with an embodiment of the present invention.

When the master 302 wants to select the group write slaves 306 for either simultaneous group writing or individual writing, the master 302 communicates the slave address and slave ID information to the group write slaves 306 via the shared data bus 314 and group ID information and command information via the command data bus 312, as in step 202. The group write slaves 306 will examine the slave ID information, the group ID information and the command information to determine if the slaves have been selected for individual or group write functions. The group write slaves 306 make this determination in the following way. The slave address information and slave ID information are communicated to the group write slaves 306 via the first ID input 8 and the group ID information is communicated to the group write slaves 306 via the second ID input 10. The slave ID information and the group ID information are then compared by ID comparator 14 to see if they are equal to each other. If they are equal, ID comparator 14 sends an enable signal to ID AND gate 12 thus enabling ID AND gate 12 to communicate the slave address information to the slave module 6.

Similarly, the command information is communicated to the group write slaves 306 via select input 28. The command information includes an attribute field containing group write identification information and individual write identification information. In addition, it should be noted that all group write slaves 306 share the same group write identification information so that during a group write mode they will all be selected. This attribute field is then examined by the group write comparator 30 and the individual select comparator 32 to determine if the group write identification information matches a predefined group write command or a predefined individual select command.

If the group write identification information matches the predefined group write command contained within the group write comparator 30 then group write slaves 306 are in a group write operation mode, meaning that group write slaves 306 are being written to as a group. In this case, group write comparator 30 will communicate an enable signal to select AND gate 36 via OR gate 34. In addition, because the slave ID information and the group ID information are equal to each other, ID comparator 14 will communicate an additional enable signal to select AND gate 36. Once these conditions are met, select AND gate 36 is enabled and the command information received at select input 28 is communicated to slave module 6.

Likewise, if the group write identification information matches the predefined individual select command contained within individual select comparator 32 than that particular group write slave 1 contained within the group of group write slaves 306 is being written to as an individual slave. In this case however, individual select comparator 32 communicates an enable signal to select AND gate 36 via OR gate 34. Also, because the slave ID information and the group ID information are equal to each other, ID comparator 14 will communicate an additional enable signal to select AND gate 36. Again, once these conditions are met, select AND gate 36 is enabled and the command information received at select input 28 is communicated to slave module 6. However, in this case the group write slave 1 is being written to as an individual, not as part of a group.

Once the group write slaves 306 have determined that a group write command has been communicated and the group write slaves 306 have been selected, all slave address information, slave ID information and command information is communicated to the slave modules 6. Slave modules 6 will then process and execute this information/commands so as to create a slave response, such as a read acknowledgment or a write acknowledgment, which will be applied to the sequence alignment logic modules 308 as in step 204. After the information/commands are processed by the group write slaves 306, the group write slaves 306 will communicate the slave responses to the sequence alignment logic modules 308 via the type one status bus 316, type two status bus 318 and type three status bus 320.

It should be noted that the type of slave response will determine on which status bus the response is communicated. For example, if the slave response is an address acknowledgment signal to inform the master that the selected slave or group of slaves have accepted the command, then this type of response will be communicated via the type one status bus 316. If the slave response is a read data acknowledgment signal which tells the master that valid data is on the shared data bus during read operations or if the slave response is a write data acknowledgment signal which tells the master to place data on its write bus during write operations, then this type of response will be communicated via the type two status bus 318. Likewise, if the slave response is a rearbitrate request, a wait request or a write complete signal, then this type of response will be communicated via the type three status bus 320.

As mentioned above, once the first group write slave 326 and the second group write slave 328 have completed their tasks the slave responses will be communicated to the appropriate sequence alignment logic module 308. This means for example, that if the slave responses are write complete signals, the sequence alignment logic module communicated with the type three status bus 320 will be informed. If two group write slaves 306 are used as in this embodiment, first group write slave 326 may be communicated with first SAL input 76 and second group write slave 328 may be communicated with second SAL input 78. First group write slave 326 will then communicate its write complete signal to first SAL input 76 and second group write slave 328 will communicate its write complete signal to second SAL input 78. Once the sequence alignment logic module 74 receives these signals, the sequence alignment logic module 74 will combine these signals into a single signal that represents the slowest of the group write slaves.

This combined signal is then applied to the multiplexor circuitry in the sequence alignment logic modules 308 along with each group write slave 306 output as in step 206. If the group write slaves 306 have been selected, decoder circuitry 322 will communicate a multiplexor select signal to the first multiplexor select input 85 and the second multiplexor select input 93 of the multiplexor circuitry of the sequence alignment logic modules 308. If selected this signal will inform the multiplexor circuitry to allow the combined signal from the sequence alignment logic modules 308 to be communicated to the processor local bus 310. If group write slaves 306 have not been selected as a group, the multiplexor circuitry will allow the output signal from the individual group write slaves 306 to be communicated to the processor local bus 310.

The type two status bus 318 output from sequence alignment modules 308 and slave 304 is then applied to gated OR circuitry 324 as in step 208, so as to logically OR the type two status bus 318 signals together. In addition, the type three status bus 320 output from sequence alignment modules 308 and slave 304 is then applied to gated OR circuitry 324 as in step 208, so as to logically OR the type three status bus 320 signals together. However, type one status bus 316 signals are not applied to gated OR circuitry 324, but instead are communicated directly with PLB 310.

These slave responses and gated OR responses are then communicated back to the master 302 via the PLB 310 as in step 210. Step 202 through step 210 will then be repeated until the group write slave operations have been completed.

It should be noted that because not all group write slaves 306 operate at the same speed, one of the group write slaves 306 will usually be done executing the commands before the other. In this case, the group write slave 1 will send a group wait signal via type three status bus 320 to the PLB 310. This signal is communicated as in step 208 and step 210 back to the master 302 and to each group wait signal input 64 of each group write slave 306. If any one of the group write slaves 306 has not completed its commanded function, the remaining group write slaves 306 will wait until the slowest group write slave 306 has finished. In addition, the above process is true for a group rearbitrate signal as well. If any one of the group write slaves 306 needs to reprocess its information or perform an execute command a second time, a group rearbitrate signal will be communicated to the arbiter circuitry 311 in the PLB 310 via the type three status bus 320. This signal will is then communicated back to the master 302 and to each group rearbitrate signal input 66 of each group write slave 306. This instructs each group write slave 306 to wait until the slowest of the group write slaves 306 has completed its task before continuing on.

It is considered within the scope of the invention, that multiple group write slaves 1 may be used and that multiple sequence alignment logic modules 74 may be cascaded together as necessary to accommodate multiple group write slaves 1. In addition, it is to be understood that any sequence alignment logic module 74 construction suitable to the desired end purpose may be used.

In accordance with an embodiment of the invention, multiplexor circuitry may be external to or internal to the sequence alignment logic module 74. In addition, multiplexor circuitry may include a first multiplexor 84 and a second multiplexor 92 or may include N number of multiplexors.

In accordance with an embodiment of the invention, a master may be any device that controls a secondary device such as a microprocessor, or a system code server, and a slave may be any device that is controlled by a primary device or master such as main memory, L3 or other adapter circuitry.

In accordance with an embodiment of the invention, type one status buses include address acknowledge signals, type two status buses include read data acknowledge signals and write data acknowledge signals, and type three status buses include rearbitrate request signals, slave wait signals and write complete signals.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A sequence alignment logic module comprising:
   a plurality of SAL inputs for receiving a plurality of SAL input signals from a plurality of group write slaves, wherein said plurality of SAL inputs includes a first SAL input and a second SAL input;
   at least one SAL output for communicating at least one SAL output signal;
   a gated logic portion, said gated logic portion having logic circuitry communicated with said plurality of SAL inputs and said SAL output, wherein said logic circuitry is constructed so as to create said SAL output signal, the logic circuitry including logic gates for sequencing and combining said plurality of SAL input signals so as to represent the slowest of said plurality of SAL input signals; and
   a first multiplexor having a first multiplexor select input, a first data input, a first GRL data input and a first multiplexer output, wherein said first data input is communicated with said first SAL input and wherein said first GRL data input is communicated with said SAL output port.

2. A sequence alignment logic module according to claim 1, further comprising a second multiplexor having a second multiplexor select input, a second data input, a second GRL data input and a second multiplexor output, wherein said second data input is communicated with said second SAL input and wherein said second GRL data input is forced to a logic zero.

3. A sequence alignment logic module comprising:
   a plurality of SAL inputs for receiving a plurality of SAL input signals from a plurality of group write slaves, wherein said plurality of SAL inputs includes a first SAL input and a second SAL input;
   at least one SAL output for communicating at least one SAL output signal;
   a gated logic portion, said gated logic portion having logic circuitry communicated with said plurality of SAL inputs and said SAL output, wherein said logic circuitry is constructed so as to create said SAL output signal, the logic circuitry including logic gates for sequencing and combining said plurality of SAL input signals so as to represent the slowest of said plurality of SAL input signals; and
   a first multiplexor having a first multiplexor select input and a first multiplexer output, wherein when said first multiplexor select input is held to one of either a logic high or a logic low state, said first multiplexor output is equal to said first SAL input and wherein when said first multiplexor select input is held to the other of said logic high or said logic low state; said first multiplexer output is equal to said SAL output.

4. A sequence alignment logic module according to claim 3, further comprising a second multiplexer having a second multiplexer select input and a second multiplexer output, wherein when said second multiplexor select input is held to one of either a logic high or a logic low state, said second multiplexor output is equal to said second SAL input and wherein when said second multiplexer select input is held to the other of said logic high or said logic low state, said second multiplexer output is equal to either of said logic high or said logic low.

5. A method for using a group write slave and a sequence alignment logic module comprising:
   obtaining a computing system that employs a master, at least one conventional slave, group write slaves, three sequence alignment logic modules, multiplexor logic circuitry and a processor local bus;
   selecting said group write slaves so as to cause said group write slaves to create a slave responses;
   applying said slave response, as input signals to said sequence alignment logic module so as to create a mixed response, the mixed response representing the slowest of said plurality of input signals;
   applying said slave response and said mixed response to said multiplexor logic circuitry so as to create a multiplexor response representing at least one of the input signals and the mixed response;
   performing logical operations on said multiplexer response so as to create a gated OR response having a wait signal and a rearbitrate signal; and
   communicating said gated OR response to said master and to said group write slaves.

6. A method according to claim 5, wherein said obtaining a computing system includes obtaining a computing system where said master is communicated with said processor local bus which is communicated with said conventional slave and said group write slaves via a command bus and a shared bus.

7. A method according to claim 5, wherein said obtaining a computing system includes obtaining a computing system wherein said group write slaves are communicated with said sequence alignment logic modules, and wherein said sequence alignment logic modules are communicated with said processor local bus via a type one status bus, a type two status bus and a type three status bus.

8. A method according to claim 5, wherein said selecting said group write slaves include operating said computing system so as to cause said master to communicate slave address information, slave ID information, group ID information, command information and write data information to said group write slaves.

9. A method according to claim 8, wherein said selecting said group write slaves includes comparing said slave address information, said slave ID information, said group ID information and said command information using said group write slaves so as to select said group write slave.

10. A method according to claim 8, wherein said selecting said group write slaves further includes applying said command information and said write data information to said group write slaves so as to create a slave response.

11. A method according to claim 5, wherein applying said slave response to said multiplexor logic circuitry includes generating a multiplexor select signal and communicating said multiplexor select signal to said multiplexor logic circuitry.

12. A method according to claim 7, wherein said performing logical operations includes applying said type three status bus to gated OR logic circuitry so as to produce a plurality said wait signal and said rearbitrate signal.

13. A method according to claim 5, wherein said performing logical operations includes communicating said wait signal and said rearbitrate signal to said group write slaves.

14. A method according to claim 5, wherein said communicating said gated OR response includes communicating said gated OR response and said slave response to said master through said Processor Local Bus.

* * * * *